2,863,877
Patented Dec. 9, 1958

2,863,877

3-ALKOXYPHTHALIDES

Donald D. Wheeler and David C. Young, Midland, Mich., assignors to The Dow Chemical Company, Midland, Mich., a corporation of Delaware No Drawing. Application April 30, 1956
Serial No. 581,337

4 Claims. (Cl. 260—343.3)

This invention is concerned with phthalides having the formula

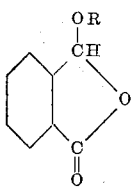

In this and succeeding formulae, R represents a higher aliphatic radical containing from 12 to 18 carbon atoms, inclusive, and selected from the group consisting of alkyl and alkenyl. This invention also includes a method for preparing these compounds.

The new compounds are amber-colored oils or low melting solids, soluble in many organic solvents such as benzene, toluene and acetone, and substantially insoluble in water. These compounds have properties which make them valuable for use as blending, thickening and plasticizing agents. Certain of the compounds exhibit parasiticidal activity and may be used for the control of bacterial organisms.

The new compounds may be prepared by causing phthalaldehydic acid to react with an appropriate hydroxy compound having the formula

ROH to produce the desired phthalide and water of reaction. The terms "phthalaldehydic acid" and "3-hydroxyphthalide" refer to a compound having the structure

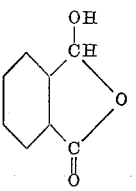

Phthalaldehydic acid is often represented in the literature as having the structure

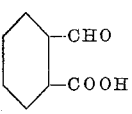

However, the acid employed in this invention and prepared as hereinafter described exists almost entirely in the closed ring, 3-hydroxyphthalide structure, as observed from a study of its infrared absorption spectrum. Infrared data also indicate the phthalide product to have the closed ring 3-hydroxyphthalide structure with the open chain ester sometimes being formed as by-product.

In the synthesis, good results are obtained when substantially equimolar proportions of each reactant are employed, however, reasonable excess of either reactant does not interfere with the reaction. Phthalaldehydic acid, if used in large excess and particularly under conditions of high temperature, may form an anhydride by-product.

The reaction takes place smoothly in the temperature range of from 15° to 150° C. but a range of from 90° to 130° C. is preferable from the standpoint of rate of reaction and convenience of operation. A solvent, such as benzene and toluene may be employed, if desired, as a reaction medium. The product obtained is separated from the water of reaction by vaporization of the latter.

In one method of carrying out the reaction, phthalaldehydic acid and an equimolar proportion or excess of the appropriate hydroxy compound are mixed and heated until the water of reaction begins to reflux, and the mixture thereafter maintained under reflux for from 0.5 to 7 hours. On completion of the heating, the reaction mixture is poured into water to form a heterogeneous mixture which separates into an aqueous phase and an organic product phase. The latter is extracted from the mixture with benzene. The benzene solution is heated to distill benzene and water and to obtain the desired product as residue. The product may be purified, if desired, by conventional methods such as distillation, washing or recrystallization.

In an alternative procedure, phthaldehydic acid and the hydroxy compound are mixed and heated at the desired temperature and at atmospheric pressure for from 1 to 6 hours. After an initial heating period at atmospheric pressure, the system is evacuated to a pressure of about 15 millimeters and the temperature gradually raised to distill the water of reaction and low boiling material and leave the desired phthalide product as residue. The latter may be purified by conventional procedures.

The following examples illustrate the invention but are not to be construed as limiting.

*Example 1.—3-normal-hexadecyloxyphthalide*

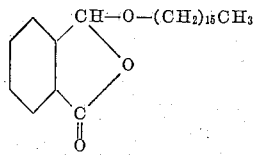

60.6 grams (0.25 mole) of normal hexadecyl alcohol and 37.5 grams (0.25 mole) of phthalaldehydic acid were mixed, heated to 120° C. and maintained under reflux for two hours. The resulting mixture was poured into 600 milliliters of water whereupon a solid precipitated. The latter was recovered by filtration, washed and dried to obtain a 3-normal-hexadecyloxyphthalide product melting at 65°–66.5° C. The latter amounted to 89.5 grams or 95 percent of theoretical.

*Example 2*

60.5 grams (0.25 mole) of hexadecyl alcohol (a mixture of primary hexadecyl alcohols having a refractive index $n_D^{20}$ of 1.4485) was mixed with 37.5 grams (0.25 mole) of phthalaldehydic acid and heated at 130° C. under reflux for two hours. The temperature varied during the heating between 115° and 130° C. The solution was then cooled and poured into 700 milliliters of water whereupon an oil precipitated. The latter was extracted from the mixture with benzene. The benzene extract was set aside and combined with additional material prepared as described below.

303 grams (1.25 moles) of hexadecyl alcohol and 187.5 grams (1.25 moles) op phthaledydic acid were mixed and heated to 130° C. and maintained under reflux. The temperature slowly dropped to 110° C. during the next two hours as water was formed. It was held under refluxing conditions for an additional four hours and then allowed to cool to obtain an amber-colored liquid. The latter was combined with the benzene extract obtained above and separated from the water by decantation. The organic phase was heated first at atmospheric pressure to distill benzene as a benzene-water azeotrope and then fractionally distilled at reduced pressure to obtain a 3-hexadecyloxyphthalide product boiling at 215°–230° C. at 1 millimeter pressure. The latter was a light yellow liquid, obtained in a yield of 451 grams or 84 percent of theoretical.

*Example 3.—3-normal-tetradecyloxyphthalide*

53.5 grams (0.25 mole) of normal tetradecyl alcohol and 37.5 grams (0.25 mole) of phthalaldehydic acid were mixed and heated until the mixture began to reflux and maintained under reflux for two hours. The resulting mixture was poured into 700 milliliters of water whereupon an oil precipitated. The latter was extracted from the mixture with benzene. The benzene extract was washed with water and then fractionally distilled to obtain a 3-normal-tetradecyloxyphthalide product boiling at 214°–218° C. at 1 millimeter pressure and melting from 49° to 54° C. The latter was obtained in a yield of 62.5 grams or 72 percent of theoretical.

*Example 4*

268 grams (1.0 mole, based on hydroxyl content) of a mixture of primary alcohols having a composition of 20.9 percent oleyl alcohol, 17.5 percent linoleyl alcohol, 50.6 percent linolenyl alcohol, 6.5 percent cetyl alcohol and 4.5 percent stearyl alcohol were mixed with 150 grams (1.0 mole) of phthalaldehydic acid. The resulting mixture was heated at from 110° to 120° C. under reflux for 2.5 hours. At the end of this period, the pressure on the system was reduced to 15–20 millimeters and the water removed by distillation. The residue was fractionally distilled to obtain a product consisting of a mixture of 3-oleyloxy-, 3-linoleyloxy-, 3-linolenyloxy-, 3-cetyloxy-, and 3-stearyloxyphthalides and boiling at 230°–235° C. at 2 millimeters pressure.

*Example 5*

250 grams (1.0 mole, based on alcoholic hydroxyl content) of a mixture of normal primary alcohols containing 62 percent hexadecyl and 35 percent octadecyl alcohols were mixed with 150 grams (1.0 mole) of phthalaldehydic acid and heated from 110° to 120° C. under reflux for 2.5 hours. The resulting mixture was allowed to cool and 500 milliliters of benzene added thereto whereupon a benzene layer and a water layer formed. The two layers were separated by decantation. The benzene solution was then distilled to remove first the remaining water as a benzene-water azeotrope and then the benzene, and finally to obtain a product consisting of a mixture of 3-octadecyloxy- and 3-hexadecyloxyphthalides in a yield of 350 grams or 93 percent of theoretical. The product was a liquid boiling from 220° C. to 230° C. at 2 millimeters pressure. On standing, the liquid turned to a solid melting from 50° to 55° C.

*Example 6.—3-normal-dodecyloxyphthalide*

46.5 grams (0.25 mole) of normal dodecyl alcohol and 37.5 grams (0.25 mole) of phthalaldehydic acid are mixed and heated until the mixture begins to reflux and thereafter maintained under reflux for two hours. The resulting mixture is poured into 700 milliliters of water whereupon an oil precipitates. The latter is extracted from the mixture with benzene and the benzene solution washed with water and then fractionally distilled to obtain 3-normal-dodecyloxyphthalide having a molecular weight of 318.

The products of the present invention are useful as plasticizers for polyvinyl chloride film. For example, a calendered polyvinyl chloride film plasticized with 3-hexadecyloxyphthalide product exhibited elongation properties comparable to, and color stability and resistance to exudation superior to films plasticized with dioctyl phthalate, a commonly employed plasticizer. In a representative comparison, calendered polyvinyl chloride film, prepared from a composition containing 100 parts by weight of a polyvinyl chloride resin (a resin having a viscosity of 2 centipoises at 120° C. in a 2 percent o-dichlorobenzene solution) and 50 parts by weight of the hexadecyloxyphthalide product as plasticizer had an elongation value of 322 percent. A similar film prepared from a composition employing the same proportion of dioctyl phthalate as plasticizer had an elongation value of 324 percent.

The phthalaldehydic acid employed in this invention may be prepared by first photochlorinating o-xylene to obtain $\alpha,\alpha,\alpha',\alpha'$-pentachloro-o-xylene by passing chlorine gas into o-xylene while illuminating with sun lamps. The resulting chlorinated o-xylene may be heated with an aqueous solution containing from 4 to 35 percent by weight of a metal halide such as ferric chloride to obtain phthalaldehydic acid as more fully described in a copending application of James D. Head and Owen D. Ivins, Serial Number 279,682, filed March 31, 1952, now Patent No. 2,748,162.

We claim:

1. The phthalide having the formula

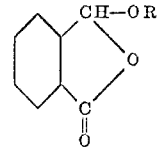

wherein R represents a higher aliphatic radical containing from 12 to 18 carbon atoms, inclusive, and selected from the group consisting of alkyl and alkenyl.

2. 3-normal-hexadecyloxyphthalide.
3. 3-normal-tetradecyloxyphthalide.
4. 3-hexadecyloxyphthalide boiling at 215°–230° C. at 1 millimeter pressure.

References Cited in the file of this patent

Richter's Org. Chem., vol. I, pages 155 and 158, Elsevier (1944).
Karrer: Org. Chem., page 116, Elsevier (1944).
Jordon: Tech. of Solv., page 99, Hill (1937).
Grove: Biochem. J., 54, pages 664–673 (1953).
Racine: Annalen, vol. 239, page 83 (1887).
Auwers et al.: Berichte 52, pages 587, 596 (1919).
Kohlrausch et al.: Berichte 77, page 471 (1944).